(12) United States Patent
Masuda et al.

(10) Patent No.: US 8,134,826 B2
(45) Date of Patent: Mar. 13, 2012

(54) CAPACITOR AND METHOD OF MANUFACTURING THE SAME

(75) Inventors: Hidetoshi Masuda, Takasaki (JP);
Masaru Kurosawa, Takasaki (JP);
Kotaro Mizuno, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 940 days.

(21) Appl. No.: 12/139,450

(22) Filed: Jun. 13, 2008

(65) Prior Publication Data
US 2009/0195963 A1 Aug. 6, 2009

(30) Foreign Application Priority Data

Jun. 14, 2007 (JP) .................................. 2007-158085
Aug. 29, 2007 (JP) .................................. 2007-221916
Apr. 23, 2008 (JP) .................................. 2008-113254

(51) Int. Cl.
*H01G 4/20* (2006.01)
*H01G 4/005* (2006.01)
*H01G 4/06* (2006.01)
*H01G 4/236* (2006.01)

(52) U.S. Cl. ......... 361/312; 361/303; 361/311; 361/307
(58) Field of Classification Search .................. 361/311, 361/303, 307, 312
See application file for complete search history.

(56) References Cited

U.S. PATENT DOCUMENTS
6,411,492 B1 * 6/2002 Kar-Roy et al. .............. 361/305

FOREIGN PATENT DOCUMENTS
JP S61-029133 A1 2/1986
JP 2003-249417 A1 9/2003

OTHER PUBLICATIONS

Hideki Masuda, "Formation and Functionality of Highly Regulated Alumina Nanohole Arrays by Self-organization Process", Applied Physic vol. 72, No. 10 (2003), pp. 1280-1285.

* cited by examiner

*Primary Examiner* — Jayprakash N Gandhi
*Assistant Examiner* — Arun Ramaswamy
(74) *Attorney, Agent, or Firm* — Law Office of Katsuhiro Arai

(57) ABSTRACT

A capacitor includes a pair of electrically conductive layers; a plurality of substantially or nearly tubular dielectric materials disposed between the pair of electrically conductive layers formed of anodic oxide of metal; first electrodes which are filled in hollow portions of the dielectric materials and connected to one of the electrically conductive layers; and a second electrode that is filled in voids between the respective dielectric materials and connected to the other electrically conductive layer.

7 Claims, 7 Drawing Sheets

CAPACITOR AND METHOD OF MANUFACTURING THE SAME

BACKGROUND OF THE INVENTION

1. Field of the Invention

The present invention relates to a capacitor and a method of manufacturing the same, and particularly to enhancement of capacitance density, enhancement of facultativity of electrode metal and simplification of a manufacturing process.

2. Description of the Related Art

Al electrolytic capacitors and laminated ceramic capacitors are known as capacitors which are broadly used at present. The Al electrolytic capacitors have a problem that liquid leak, etc. occurs due to use of electrolytic liquid, etc. Furthermore, the laminated ceramic capacitors require a burning step, and thus it induces thermal shrinkage between an electrode and a dielectric member, etc. For example, as a technique of implementing a compact and large-capacitance capacitor is known a grain boundary insulating type semiconductor magnetic capacitor disclosed in JP-B-Sho-61-29133, and a capacitor structure and a manufacturing method thereof disclosed in JP-A-2003-249417.

The JP-B-Sho-61-29133 discloses a grain boundary insulation type semiconductor ceramic capacitor comprising a semiconductor grain boundary insulation type dielectric ceramic having plural through holes extending to confronting end faces, external connection electrodes provided to the respective confronting end faces of the dielectric ceramic, and a capacitance electrode member which is inserted into each through hole of the dielectric ceramic and formed of metal having high melting point, the capacitance electrode members which are adjacent to each other being conductively connected to the different external connection electrodes. Furthermore, JP-A-2003-249417 discloses a method of conducting thin film formation processing using as a mask a porous substrate obtained by anodizing a substrate to form a first electrode having many columnar (pillar-shaped) members arranged regularly on the surface of a capacitor substrate, a dielectric thin film formed on the surface of the first electrode so as to cover the outside of each columnar (pillar-shaped) member, and a second electrode formed on the surface of the dielectric thin film so as to cover the outside of each columnar (pillar-shaped) member, thereby obtaining a capacitor structure.

However, the background arts as described above have the following problems.

First, in the technique of the JP-B-Sho-61-29133, the semiconductor grain boundary insulation type dielectric ceramic having plural through holes is used as the dielectric layer, and it has a structure that the capacitance electrode members are selectively inserted in the respective through holes. However, the microfabrication is difficult, and it is difficult to increase the capacitance by increasing the area. Furthermore, in the technique of the JP-A-2003-249417, adhesion of the electrode material to the porous substrate used as the mask, expansion of the holes, etc. occur owing to etching of the porous substrate itself, so that it is difficult to obtain the columnar (pillar-shaped) members having a uniform cross-sectional shape and a desired length. Furthermore, when the length of the columnar (pillar-shaped) members in the vertical direction increases, the film thickness of the dielectric thin film to be afterwards formed is liable to be dispersed, so that it is difficult to increase the capacitance by increasing the length of the columnar (pillar-shaped) members.

SUMMARY OF THE INVENTION

At least one of the disclosed embodiments of the present invention has been implemented in view of the foregoing attention, and has an object to provide a capacitor whose capacitance density can be enhanced, and a method of manufacturing the capacitor. Furthermore, at least one of the disclosed embodiments of the present invention has an object to provide a capacitor for which facultativity (degree of freedom) of electrode metal material can be enhanced and a manufacturing process can be simplified, and a method of manufacturing the capacitor.

In order to attain one or more of the above objects, according to an aspect of the present invention, there is provided a capacitor comprising: a pair of electrically conductive layers that are disposed at a predetermined interval so as to face each other; a plurality of substantially or nearly tubular dielectric materials that are substantially or nearly orthogonal to the dielectrically conductive layers so that opening portions at both the ends thereof are connected to the inside principal surfaces of the pair of electrically conductive layers, are formed of anodic oxide of metal and have a high aspect ratio; first electrodes which are filled in hollow portions of the dielectric materials so that one ends thereof are connected to one of the electrically conductive layers and the other ends thereof are insulated from the other electrically conductive layer; and a second electrode that is filled in voids between the respective dielectric materials so that one end thereof is connected to the other electrically conductive layer and the other end thereof is insulated from the one electrically conductive layer.

According to an embodiment of the present invention, the substantially or nearly tubular structure which is formed of anodic oxide of metal and has a high aspect ratio is used as the dielectric material, the electrodes are provided inside and outside the dielectric material, and the positive electrode and the negative electrode are formed coaxially with each other. In addition, the insulating gap (interval) or the insulator is provided at the tip of the substantially or nearly columnar (pillar-shaped) electrode to allocate the electrodes, and thus the area for defining the capacitance can be increased, so that the capacitance can be increased.

Furthermore, in the above capacitor, each of the first and second electrodes and each of the electrically conductive layers are insulated from each other by a gap provided between each of the first and second electrodes and each of the electrically conductive layers. Each of the first and second electrodes and each of the electrically conductive layers are insulated from each other by an insulator provided between each of the first and second electrodes and each of the electrically conductive layers. The insulator is formed of metal oxide, $SiO_2$ or resin. The dielectric materials are located at apex and center positions of each hexagon forming a honeycomb structure on a cross-section which is substantially or nearly parallel to the electrically conductive layers.

According to another aspect of the present invention, there is provided a capacitor manufacturing method comprising: a first step of anodically oxidizing a metal base material to form plural holes having a high aspect ratio in a direction substantially or nearly orthogonal to a pair of confronting principal surfaces of the base material so as to be opened at one principal surface and closed at the other principal surface; a second step of forming an electrically conductive seed layer on the other whole principal surface of the base material; a third step of processing the base material to form substantially or nearly tubular dielectric materials having the holes as hollow portions; a fourth step of embedding electrical conductor in voids surrounding the dielectric materials so that opening ends of the dielectric materials are exposed at a predetermined thickness, thereby forming a first electrode on the seed layer; a fifth step of forming an electrically conductive layer on the one principal surface of the base material to cover the exposed opening end faces of the dielectric materials, forming an insulating gap between the electrically conductive layer and the first electrode and removing the seed layer; a sixth step of cutting a structure obtained in the fifth step by a predetermined thickness along a principal surface of the base material exposed after the seed layer is removed, thereby opening the closed ends of the dielectric materials; a seventh step of embedding electrical conductor in the holes of the dielectric materials by using the electrically conductive layer as a seed so that a predetermined gap is formed between the end portion of each dielectric material opened in the sixth step and the electrical conductor to form second electrodes; and an eighth step of forming another electrically conductive layer so that the other electrically conductive layer confronts the electrically conductive layer and covers the opening end faces of the dielectric materials opened in the sixth step and an insulating gap is formed between the other electrically conductive layer and each of the second electrodes.

According to the capacitor manufacturing method, the structures of the dielectric materials are formed, and then the electrode material is filled in the void portions. Therefore, there is obtained an effect that the facultativity (degree of freedom) of the kind of electrode metal is enhanced and the manufacturing process can be simplified.

Furthermore, the above capacitor manufacturing method further comprises a step of providing insulator on the first electrode formed in the fourth step 4 so as to embed steps between the first electrode and the end faces of the dielectric materials, and a step of providing an insulator on each of the second electrodes formed in the seventh step so as to embed the gap between the end portion of each of the dielectric materials and each of the second electrodes. In the above manufacturing method, the insulator provided between each of the first and second electrodes and the electrically conductive layer is formed of metal oxide, $SiO_2$ or resin. The first step comprises a step of forming the holes so that the holes are located at apex and center positions of a hexagon forming a honeycomb structure on a cross-section which is substantially or nearly parallel to the principal surface of the base material.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

DETAILED DESCRIPTION OF THE PREFERRED EMBODIMENTS

Preferred embodiments according to the present invention will be described hereunder with reference to the accompanying drawings. However, the preferred embodiments are not intended to limit the present invention. In the present disclosure where conditions and/or structures are not specified, the skilled artisan in the art can readily provide such conditions and/or structures, in view of the present disclosure, as a matter of routine experimentation.

First Embodiment

Figure 1:
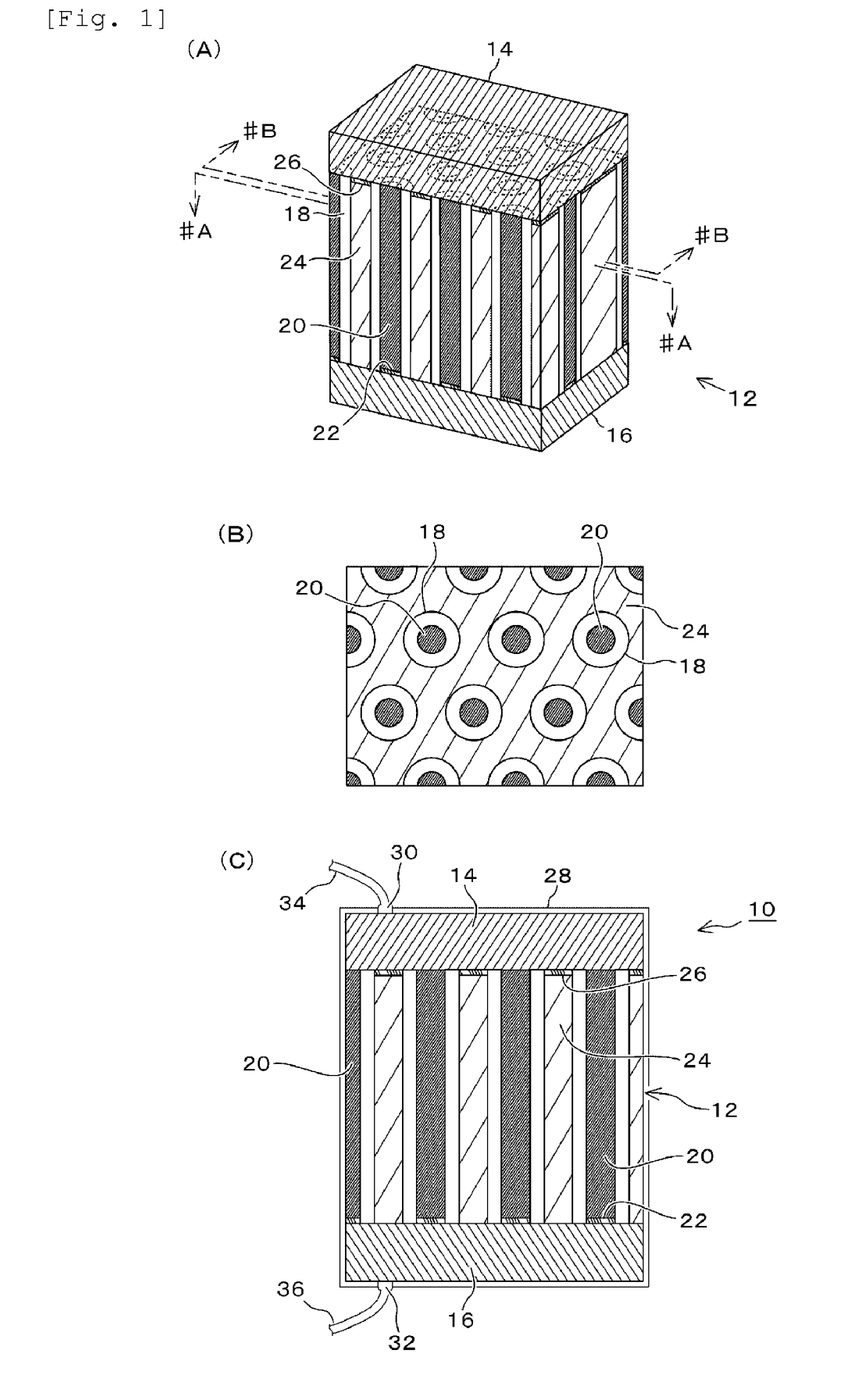
FIG. 1A is a perspective view showing the outlook of a capacitor element according to a first embodiment of the present invention.
FIG. 1B is a cross-sectional view of the capacitor element which is taken along #A-#A line of FIG. 1A and viewed in a direction of an arrow.
FIG. 1C is a cross-sectional view of a capacitor of this embodiment and also is a cross-sectional view which is taken along #B-#B line of FIG. 1A and viewed in a direction of an arrow.
Figure 4:
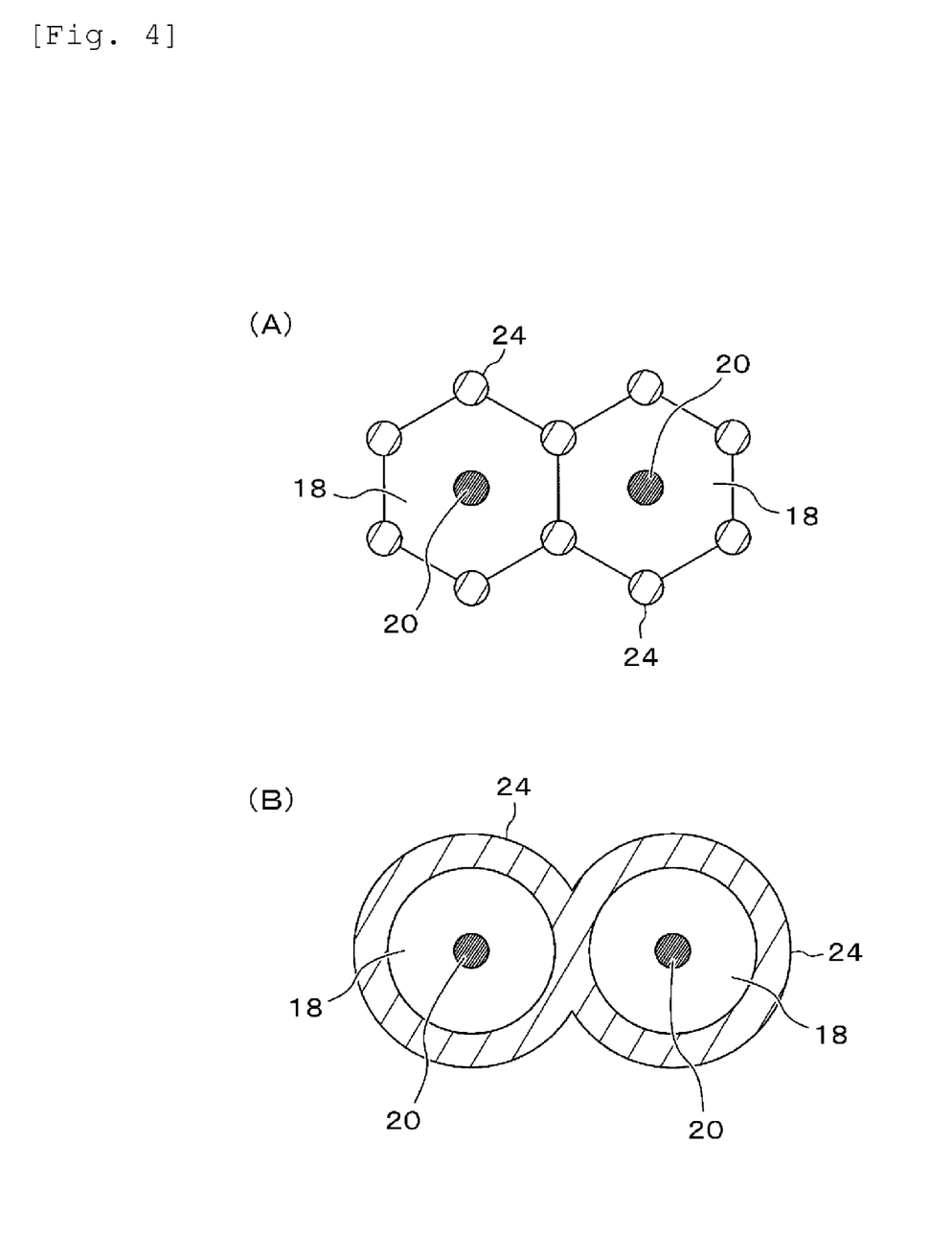
FIGS. 4A and 4B are schematic diagrams showing cross-sectional shapes of electrode structures of the first embodiment and a comparative example.

First, a first embodiment according to the present invention will be described with reference to FIGS. 1A to 4F. FIG. 1A is a perspective view showing the outlook of a capacitor element according to the first embodiment of the present invention, FIG. 1B is a cross-sectional view of the capacitor element which is taken along a #A-#A line of FIG. 1A and viewed in a direction of an arrow, and FIG. 1C is a cross-sectional view of a capacitor of this embodiment and also is a cross-sectional view which is taken along #B-#B line of FIG. 1A and viewed in a direction of an arrow, FIGS. 2A to 3F are diagrams showing examples of a manufacturing process according to the first embodiment, and FIGS. 4A and 4B are schematic diagrams showing cross-sectional shapes of electrode structures of the first embodiment and a comparative example.

The capacitor 10 according to this embodiment is mainly constructed by a capacitor element 12 as shown in FIGS. 1A to 1C. The capacitor element 12 comprises a pair of electrically conductive layers 14, 16 which are disposed at a predetermined interval so as to face each other, many substantially or nearly tubular dielectric materials 18, first electrodes 20 filled in the dielectric materials 18, a second electrode 24 filled between the many dielectric materials 18, insulating caps 22 for insulating the first electrodes 20 from the electrically conductive layer 16, and an insulating cap 26 for insulating the second electrode 24 from the electrically conductive layer 14. The dielectric material 18 is substantially or nearly orthogonal to the electrically conductive layers 14 and 16, and the opening portions at both the ends of the dielectric material 18 are connected to the inside principal surfaces of the electrically conductive layers 14 and 16. The dielectric material 18 having the shape as described above has a large slenderness ratio (that is, a high aspect ratio), and it is formed of anodic oxide of metal.

Particularly, the arrangement of the combination of the first electrodes 20 and the dielectric materials 18 formed around the first electrodes is important. It is preferable that the first electrodes 20 and the dielectric materials 18 are arranged so as to be located at the respective apexes of each hexagon forming a honeycomb structure and at the center position of the hexagon as shown in FIG. 1B and the arrangement relationship is satisfied in any combination. The gap between the dielectric materials 18 is perfectly filled with the second electrode 24, whereby the dielectric material 18 is sandwiched by the first electrodes 20 and the second electrode 24, so that the capacitance forming balance is made proper and the capacitance can be maximized. Accordingly, it is preferable that the first electrodes 20 and the dielectric materials 18 are in the relationship that they are located at the apex and center positions of each hexagon which is as small as possible. The limitation of this relationship is determined by the etching precision, the withstand voltage characteristic of the dielectric 18, etc. A capacitor having a high capacitance can be implemented in connection with the progress of these techniques.

For the dielectric material 18 is used oxide of valve metal (for example, Al, Ta, Nb, Ti, Zr, Hf, Zn, W, Sb or the like), and for the electrically conductive layers 14, 16 is used general metal (for example, Cu, Ni, Cr, Ag, Au, Pd, Fe, Sn, Pb, Pt, Ir, Rh, Ru, Al or the like). For the first electrode 20 and the second electrode 24 is used Cu, Ni, Cr, Ag, Au, Pd, Fe, Sn, Pb, Pt, Co or alloy thereof. For the insulating caps 22 and 26 is used metal oxide, $SiO_2$, electrodeposited resin (for example, polyimide, epoxy, acryl or the like). Specifically, the metal oxide contains oxide of valve metal (Al, Ta, Nb, Ti, Zr, Hf, Zn, W, Sb or the like), deposited $TiO_2$ and composite oxide having $ABO_3$ structure.

Examples of the dimensions of the respective parts of the capacitor element 12 are as follows. That is, the interval between the electrically conductive layer 14 and the electrically conductive layer 16 is set to several μm to several hundreds μm (or on the order of $10^{-6}$ m to $10^{-4}$ m), the thickness of the electrically conductive layers 14 and 16 is set to several tens nm to several μm (or on the order of $10^{-8}$ m to $10^{-6}$ m), the inner and outer diameters of the tubular dielectric material 18 are set to about several nm to several hundreds nm (or on the order of $10^{-9}$ m to $10^{-7}$ m). The thickness of the insulating caps 22 and 26 is set to several tens nm to several tens m (or on the order of $10^{-8}$ m to $10^{-5}$ m), the interval between the dielectric materials 18 is set to several tens nm to several hundreds nm (or on the order of $10^{-8}$ m to $10^{-7}$ m), and the thickness (outer diameter−inner diameter) of the dielectric material 18 is set to about several nm to several hundreds nm (or on the order of $10^{-9}$ m to $10^{-7}$ m).

In this embodiment, the electrically conductive layer 14 is set as a surface electrode, the electrically conductive layer 16 is set as a back surface electrode, the first electrode 20 is set as a negative electrode, and the second electrode 24 is set as a positive electrode. However, this is merely an example, and they may be changed as occasion demands. The thus-constructed capacitor element 12 is wholly coated with an insulating film 28 as shown in FIG. 1C, and it is connected from openings provided at predetermined positions of the insulating film 28 through connection lands 30, 32 to lead-out portions 34, 36 such as lead wires or the like.

Figure 2:
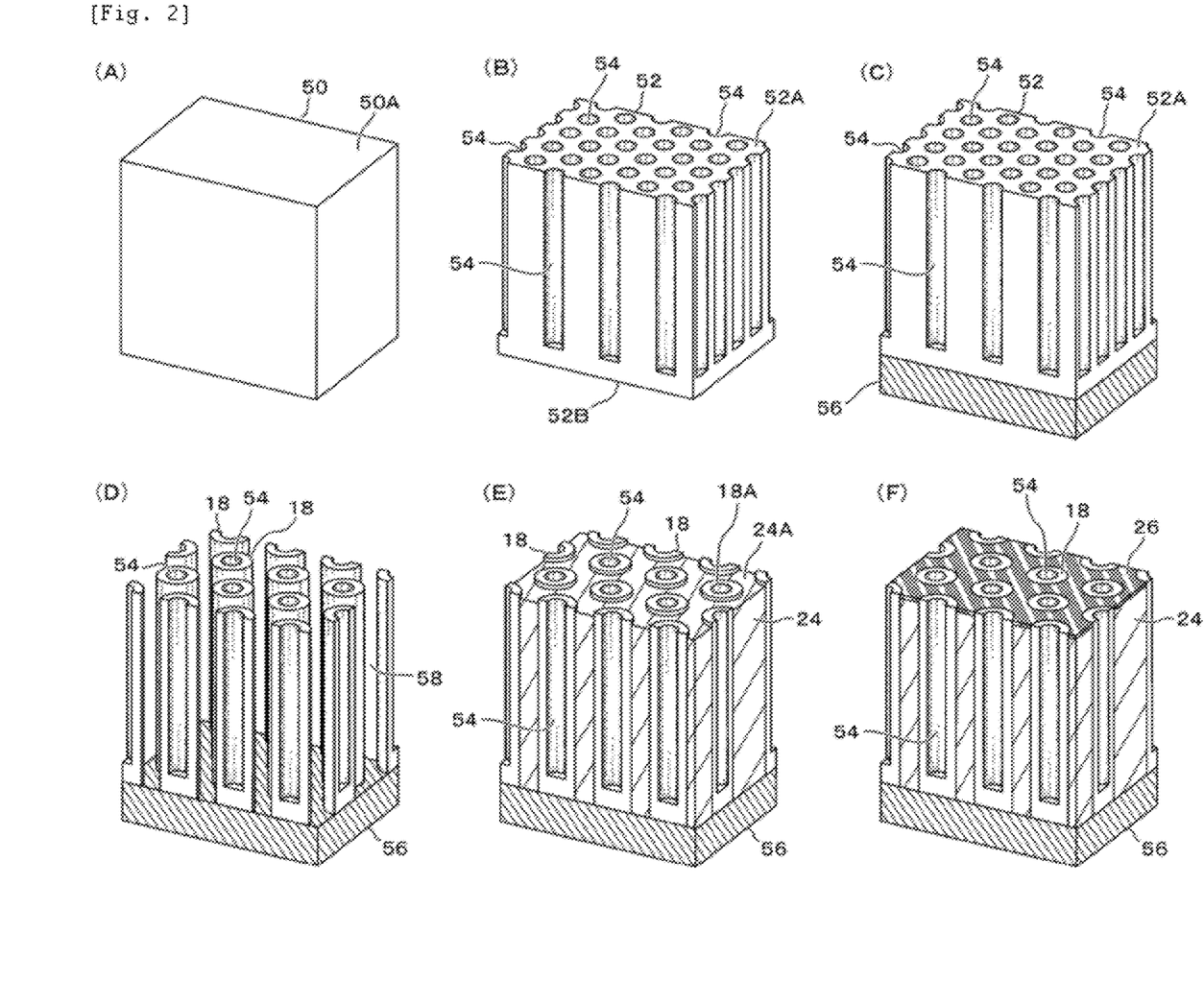
FIGS. 2A to 2F are diagrams showing an example of a manufacturing process according to the first embodiment.
Figure 3:
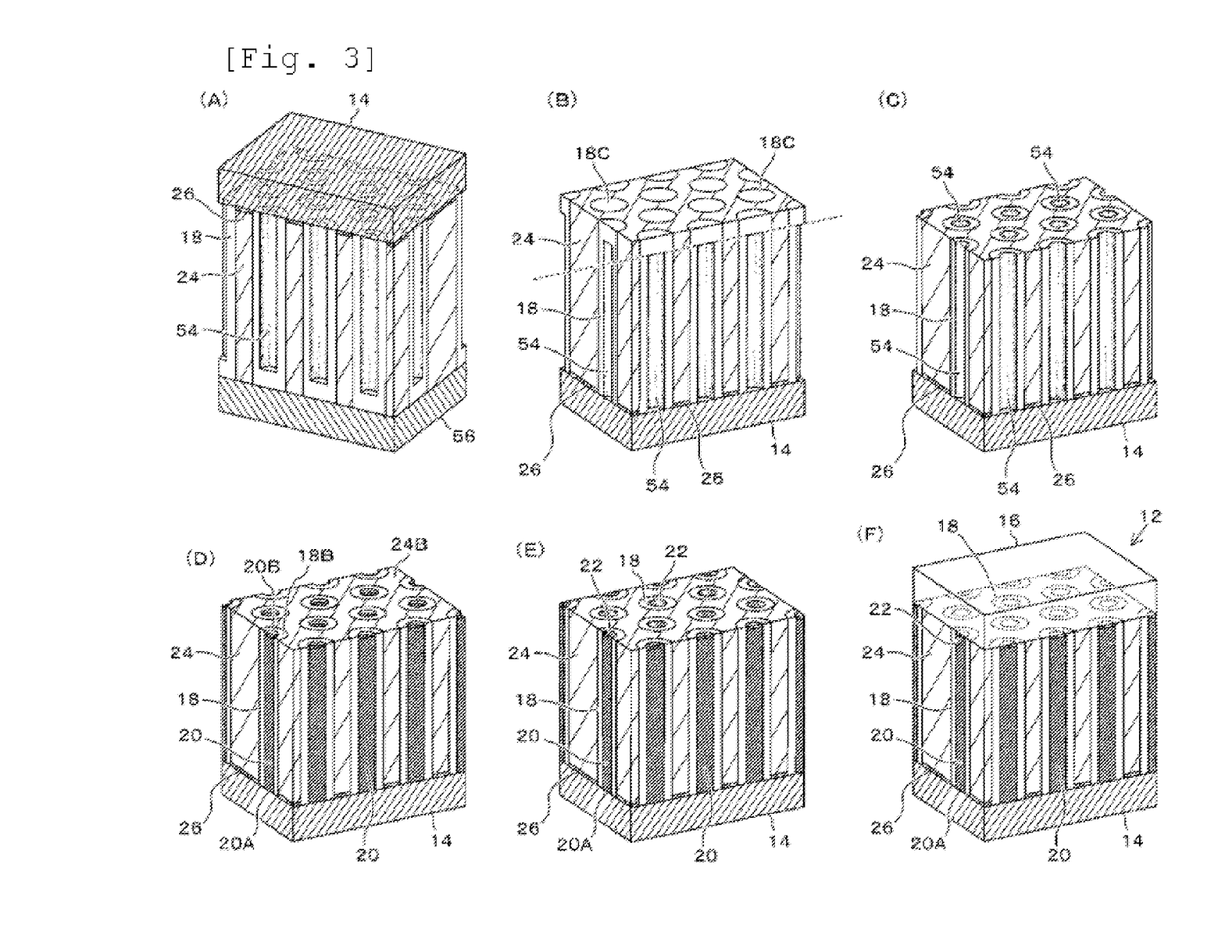
FIGS. 3A to 3F are diagrams showing an example of the manufacturing process according to the first embodiment.

Next, a method of manufacturing the capacitor 10 according to this embodiment will be described with reference to FIGS. 2 and 3. First, as shown in FIG. 2A, a base material 50 formed of valve metal (Al, Ta, Nb, Ti, Zr, Hf, Zn, W, Sb or the like) is prepared. Pits (not shown) serving as base points of anodic oxidation are formed in a honeycomb style on the surface 50A of the base material 50. Subsequently, as shown in FIG. 2B, many substantially or nearly columnar (pillar-shaped) holes 54 are formed by anodic oxidation processing. In this embodiment, the holes 54 are formed so as to be located at the apexes and center of each hexagon forming the honeycomb structure on the cross-section which is substantially or nearly orthogonal to the principal surface of the oxide base material 52. The technique of forming the holes 54 as described above is well known (e.g., Hideki Masuda, "Formation and Functionality of Highly Regulated Alumina Nanohole Arrays by Self-organization Process", Applied Physic Vol. 72, No. 10 (2003), pp1280-1285, the disclosure of which is herein incorporated by reference for the purposes of providing methods for forming holes). Hole arrays having a diameter of about 30 nm and a pitch of about 100 nm can be obtained at about 40 V (oxalic acid), for example. Applied voltage and diameter and pitch are correlated at 1 nm/V for diameter and at 2.5 nm/V for pitch. When aluminum is used as the base material 50, both erosion and anodic oxidation progress, thereby forming holes constituted by the dielectric material (anodic oxide material) 52 which is $Al_2O_3$. In the example shown in the figures, the holes 54 are opened at one end portions at the surface 52A of the oxide base material 52, and the other end portions thereof are closed at the back surface 52B side of the oxide base material 52.

Subsequently, as shown in FIG. 2C, a seed layer 56 formed of electrically conductive element is formed at the back surface 52B. As the seed layer 56 is used general metal (for example, Cu, Ni, Cr, Ag, Au, Pd, Fe, Sn, Pb, Pt, Ir, Rh, Ru, Al or the like). The seed layer 56 has not only a plate seed function, but also a function of supporting the tubular dielectric material 18 formed in the following process. Subsequently, the oxide base material 52 is etched so that the holes 54 and the surrounding portions thereof (which will be pipe-shaped portions in combination) are left, thereby forming substantially or nearly tubular dielectric materials 18 containing the holes 54 as hollow portions on the seed layer 56 as shown in FIG. 2D. At this time, many voids 58 are formed in the gaps between the respective dielectric materials 18. Then, the result structure is plated by using the seed layer 56 as a seed to fill the voids 58 with plated conductor as shown in FIG. 2E, thereby forming the second electrode 24. At this time, this process is carried out so that a predetermined gap (step) occurs between the 24A of the second electrode 24 and the opening end face 18 of each dielectric material 18. Furthermore, an insulating cap 26 is formed on the surface 24A of the second electrode 24 as shown in FIG. 2F by anodic oxidation, electrodeposition of oxide, electrodeposition of resin or the like. When the anodic oxidation is carried out, a plus voltage is applied by using the seed layer 56 as a power feeding layer.

Subsequently, an electrically conductive layer 14 (the surface electrode in this embodiment) is formed on the insulating cap 26 by PVD or the like as shown in FIG. 3A. The electrically conductive layer 14 closes the opening end face 18A side of each dielectric material 18, however, it is kept insulated from the second electrode 24 by existence of the insulating cap 26. In the process subsequent to the step shown in FIG. 3B, the description will be made under the state that the structure shown in FIG. 3A is rotated by 180° in the up-and-down direction so as to be turned upside down and then viewed from the back side.

After the electrically conductive layer 14 is formed, the seed layer 56 at the back side is removed, and the closed opening end faces 18C of the dielectric materials 18 are exposed as shown in FIG. 3B. As indicated by a dashed line in FIG. 3B, the oxide base material 52 is cut out along a plane which is substantially or nearly parallel to the principal surface as shown in FIG. 3C, thereby opening the bottom portions of the dielectric materials 18. Subsequently, the electrically conductive layer 14 is used as a seed to embed the hollow portions of the dielectric materials 18 by plating as shown in FIG. 3D, thereby forming the first electrodes 20. The first electrodes 20 are formed so that a predetermined step is generated between the end face 20B of each first electrode 20 and the opening end face 18B of each dielectric material 18. Furthermore, insulating caps 22 are formed on the end faces 20B of the first electrodes 20 by anodic oxidation, electrodeposition oxide, electrodeposition of resin or the like as shown in FIG. 3E. Finally, an electrically conductive layer 16 (back side electrode) is formed on the insulating caps 22 as shown in FIG. 3F. Accordingly, the capacitor element 12 having a coaxial structure that the electrically conductive layer 14 is connected to the first electrodes 20 in the dielectric material 18, and the electrically conductive layer 16 is connected to the second electrode 24 at the outside of the dielectric materials 18 can be obtained through the above process.

If the second electrodes 24 (positive electrodes) are disposed at apexes of a hexagon forming a honeycomb structure and the first electrode 20 (negative electrode) is disposed at the center of the hexagon concerned as shown in a comparative example of FIG. 4A, the first electrode 20 at the center position is surrounded by the six second electrodes 24 through the dielectric material 18, and thus the respective spaces between the second electrodes 24 on the outer periphery are useless. On the other hand, according to this embodiment, as shown in FIG. 4B, the first electrode 20 and the second electrode 24 are constructed so as to be disposed coaxially with each other. Therefore, as compared with the electrode arrangement of the comparative example shown in FIG. 4A, the space can be more effectively used, so that the capacitance can be increased by about 1.5 times under the condition that the distance between the positive and negative electrodes is equal.

As described above, according to the first embodiment, the first electrode 20 and the second electrode 24 are provided inside and outside the substantially or nearly tubular dielectric material 18 which is formed of anodic oxide of metal and has a high aspect ratio (e.g., . . . to . . . ) to form the positive electrode and the negative electrode coaxially, and also the insulating caps 22 and 26 are provided to the tips of the first electrode 20 and the second electrode 24 to thereby allocate the electrodes. Therefore, the following effects can be obtained.

(1) The capacitance can be increased by increasing the area for defining the capacitance.

(2) The insulating caps 22, 26 of dielectric material are used to allocate the electrodes, and thus the areas of the tip faces of the first electrode 20 and the second electrode 24 can be used to increase the capacitance of the capacitor 10.

(3) The first electrodes 20 and the second electrode 24 are filled in the void portions after the structure of the dielectric materials 18 is formed. Therefore, facultativity (degree of freedom) of the electrode material can be increased, and also the manufacturing process can be simplified.

Second Embodiment

Figure 5:
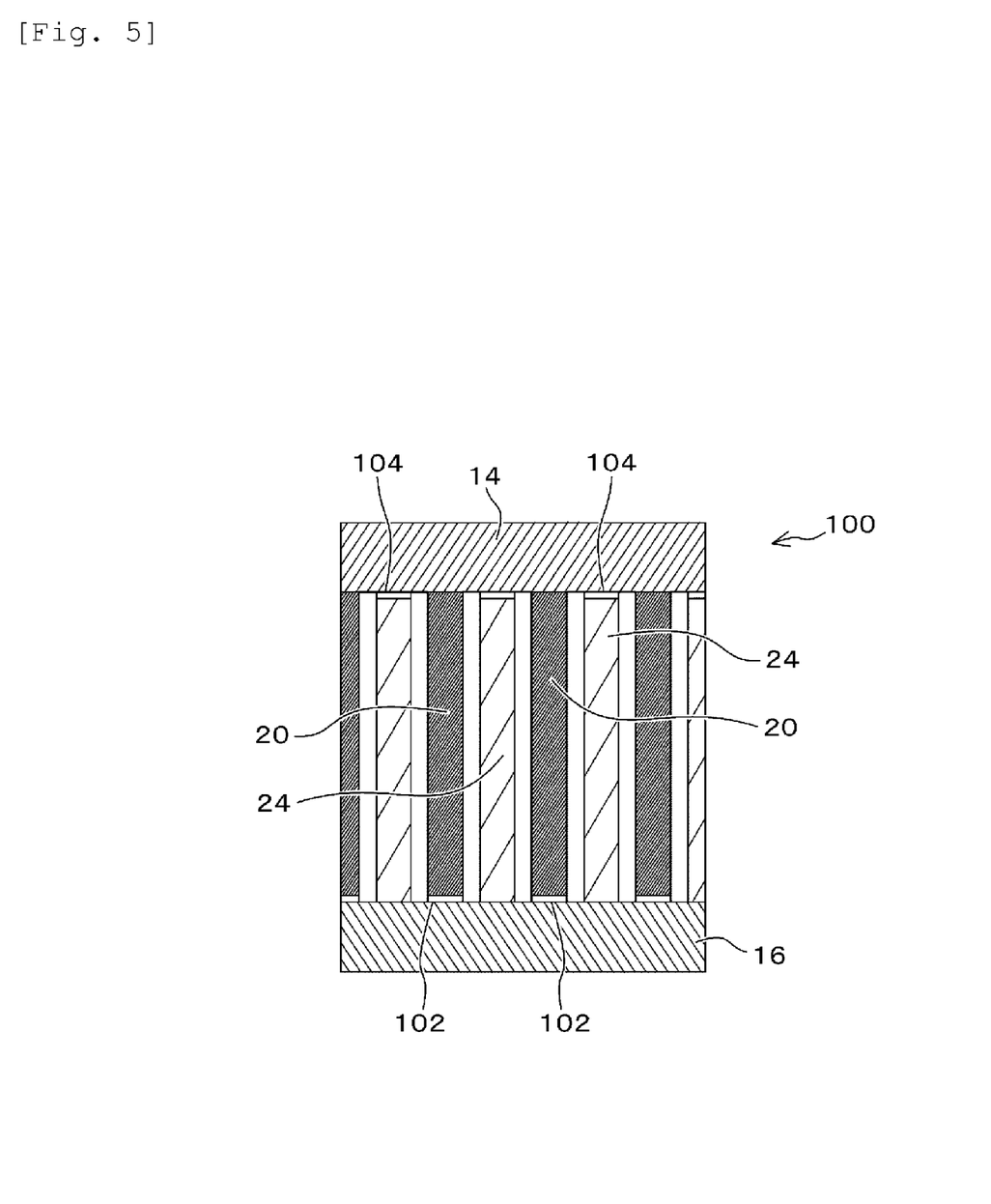
FIG. 5 is a cross-sectional view showing the main part of a capacitor element according to a second embodiment of the present invention.
Figure 6:
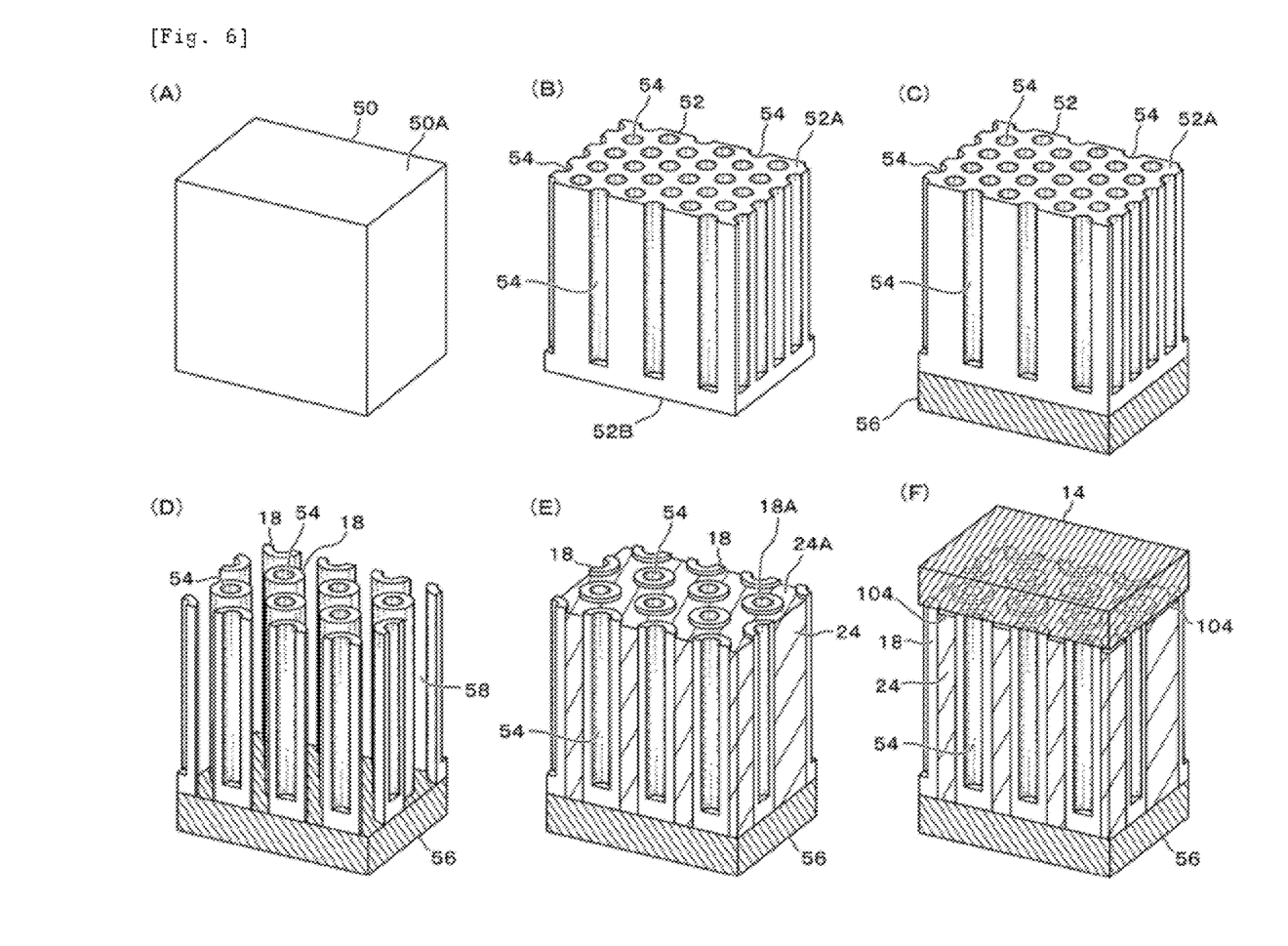
FIG. 6 is a diagram showing an example of a manufacturing process of the second embodiment.
Figure 7:
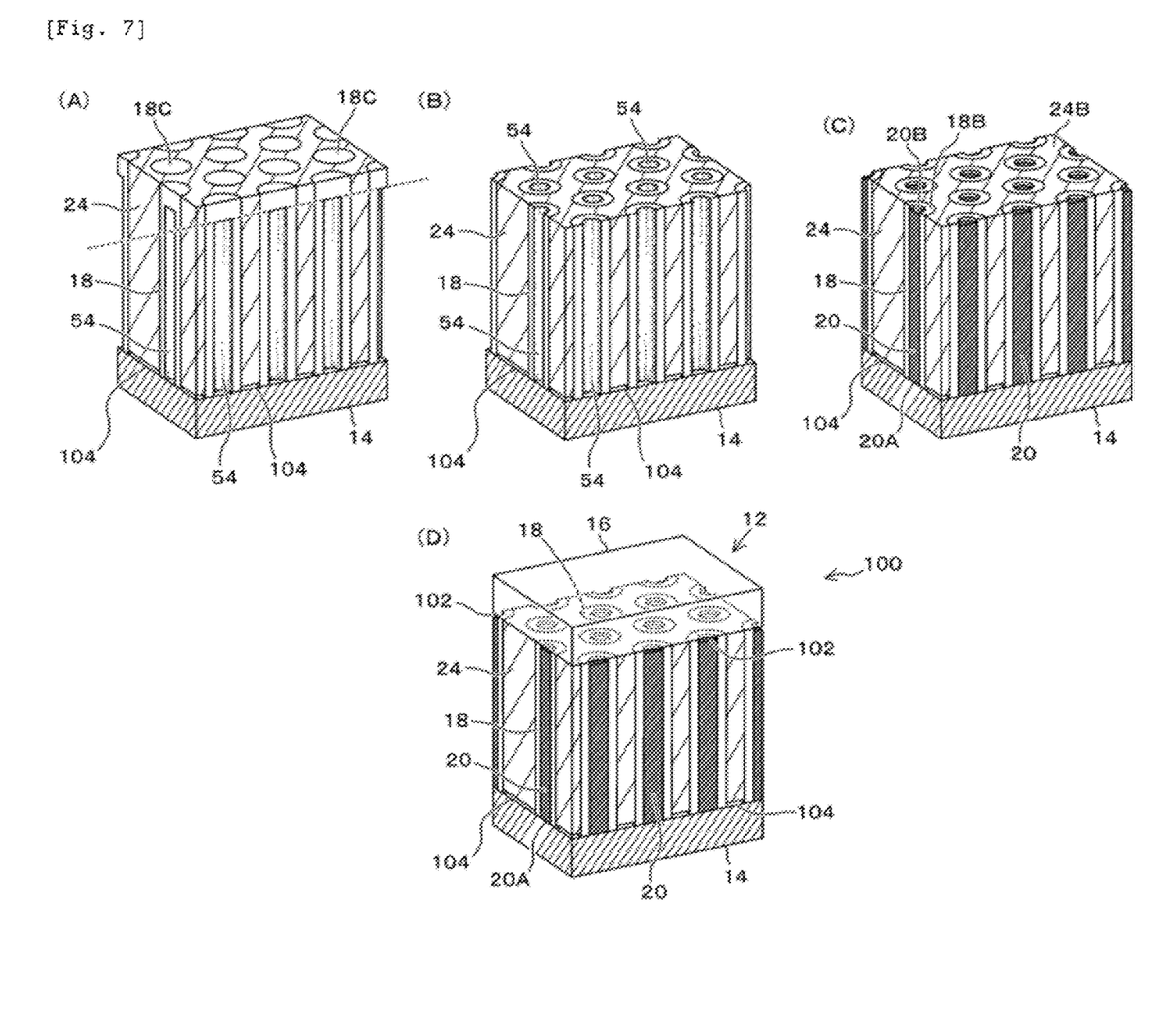
FIG. 7 is a diagram showing an example of the manufacturing process of the second embodiment.

Next, a second embodiment according to the present invention will be described with reference to FIGS. 5 to 7. The same/corresponding constituent elements as/to the above-described embodiment are represented by the same reference numerals. FIG. 5 is a cross-sectional view showing the main part of a capacitor element according to this embodiment, and FIGS. 6A to 7D are diagrams showing an example of the manufacturing process of this embodiment. In this embodiment, as shown in the cross-sectional view of FIG. 5, an air gap 102 is formed between the tip of the first electrode 20 and the electrically conductive layer 16, and also an air gap 104 is formed between the tip of the second electrode 24 and the electrically conductive layer 14. The insulation is established by the air gaps 102 and 104, thereby allocating the electrodes. This basic structure is the same as the first embodiment.

Next, a manufacturing method according to this embodiment will be described with reference to FIGS. 6 and 7. The steps from FIG. 6A to FIG. 6E are the same as the first embodiment described above, and the second electrode 24 is filled in the gaps 58 between the respective substantially or nearly tubular dielectric materials 18.

In this embodiment, after the second electrode 24 is filled in the gaps 58 between the dielectric materials 18, the electrically conductive layer 14 is provided so as to close the opening end faces 18A of the dielectric materials 18 as shown in FIG. 6F, whereby the air gap 104 for insulation is formed between the electrically conductive layer 14 and the second electrode 24. Subsequently, the seed layer 56 is removed to expose the closed end faces 18C of the dielectric materials 18 as shown in FIG. 7A. In the process subsequent to this step, the description will be made under the state that the structure shown in FIG. 6F is rotated in the up-and-down direction by 180° (i.e., turned upside down) and viewed from the back side. The back surface is cut out along a plane which is substantially or nearly parallel to the principal surface of the base material as indicated by a dashed line of FIG. 7A, thereby opening the end portions of the dielectric materials 18 as shown in FIG. 7B.

Subsequently, as shown in FIG. 7C, the electrically conductive layer 14 is used as a seed to embed the inside of the dielectric materials 18 by plating, thereby forming the first electrode 20. At this time, the plating is carried out so that the end faces 20B of the first electrodes 20 do not reach the opened end faces 18B of the dielectric materials 18. Thereafter, as shown in FIG. 7D, the electrically conductive layer 16 is formed on the back surface 24B of the second electrode. The electrically conductive layer 16 is formed so as to close the opened end faces 18B, and thus it is not connected to the end faces 20B of the first electrodes 20. The capacitor element 100 having the coaxial structure that the electrically conductive layer 14 is connected to the first electrodes 20 inside the dielectric materials 18 and the other electrically conductive layer 16 is connected to the second electrode 24 at the outside of the dielectric materials 18 is formed through the above process.

As in the case of the first embodiment, the capacitor element 100 of this embodiment is wholly coated with insulating film or the like, and electrodes are led out at proper positions. The basic effect of this embodiment is basically the same as the first embodiment. However, the electrodes are allocated by using the air gaps 102, 104, so that the manufacturing process can be more simplified.

The present invention is not limited to the above-described embodiments, and various modifications may be made without departing from the subject matters of the disclosed embodiments of the present invention. For example, the following modifications may be made.

(1) The shape and dimension shown in the above embodiments are merely examples, and the skilled artisan in the art can readily change them as occasion demands, based on the present disclosure.

(2) With respect to the materials, various kinds of well-known materials may be used. For example, aluminum is preferably used as the metal base material forming the dielectric materials, however, the skilled artisan in the art can readily apply various other kinds of suitable metal insofar as they can be anodized (anodic oxidation), based on the present disclosure.

(3) The method of forming the insulating caps 22, 26 shown in the first embodiment is an example, and the skilled artisan in the art can readily change them so as to attain the same or similar effect, based on the present disclosure. For example, in the first embodiment, the anodic oxidation is used as a specific example. However, insulation may be established by another insulator. For example, after the step shown in FIG. 2E of the first embodiment, an insulating cap 26 formed of $TiO_2$ may be formed by applying a minus voltage in titan chloride solution by using the seed layer 56 as a power feed layer and then conducting a heat treatment at 450°. Furthermore, after the step shown in FIG. 2E, $SiO_2$ may be electrodeposited through the exposed second electrode 24. Furthermore, catalytic metal such as Sn—Pd may be electrodeposited on one end of the electrode surface 24A to deposit $SiO_2$ under non electric field by using the electrodeposited catalytic metal as a seed. Still furthermore, resin may be coated so as to be embedded in the gap between the electrode surface 24A and the opening end face 18A of each dielectric material and then only the resin on the surface may be removed by etching or polishing, so that the resin is left in the gap. Alternatively, film of insulator may be formed so as to be embedded in the above gap and then only the insulator on the surface may be etched or polishing, so that the insulator is left in the gap. The same is also applied to the other insulating cap 22.

(4) The electrode lead-out structure shown in the first embodiment is an example, and the skilled artisan in the art can readily change the design thereof so as to obtain the same or similar effect, based on the present disclosure.

(5) The manufacturing processes shown in the above embodiments are examples, and the skilled artisan in the art can readily change them so as to obtain the same or similar effect, based on the present disclosure. For example, it is an example which one of the surface electrode and the back electrode is preferentially formed, and it may be properly changed as occasion demands. Furthermore, in the first embodiment, in order to provide the insulating caps 22, 26, each of the first electrode 20 and the second electrode 24 is filled so as not to reach one end face of the dielectric material 18. However, this is an example, and they may be exposed from the end faces of the dielectric material 18 insofar as the first electrode 20 and the second electrode 24 are not in contact with each other.

According to an embodiment of the present invention, the substantially or nearly tubular structure which is formed of anodic oxide of metal and has a high aspect ratio (e.g., 1 to $10^4$, preferably no less than 10, more no less than $10^2$) is used as the dielectric material, the electrodes are provided inside and outside the dielectric material, and the positive electrode and the negative electrode are formed coaxially with each other. In addition, the insulating gap (interval) or the insulator is provided at the tip of the substantially or nearly columnar (pillar-shaped) electrode to allocate the electrodes, and thus an embodiment of the present invention is applicable to a capacitor.

The present application claims priority to Japanese Patent Application No. 2007-158085, filed Jun. 14, 2007, No. 2007-221916, filed Aug. 29, 2007, and No. 2008-113254, filed Apr. 23, 2008, the disclosure of which is incorporated herein by reference in their entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A capacitor comprising:
a pair of plate-shaped electrically conductive layers that are disposed at a determinable interval so as to face each other;
a plurality of substantially or nearly tubular dielectric materials that are formed of anodic metal oxide and that extend from an inside principal surface of one of the electrically conductive layers to an inside principal surface of the other electrically conductive layer in a direction substantially or nearly orthogonal to the inside principal surfaces of the electrically conductive layers wherein opening portions at both ends of each tubular dielectric material are connected to the inside principal surfaces of the pair of electrically conductive layers;
first electrodes which are filled in hollow portions of the tubular dielectric materials so that one ends thereof are connected to one of the electrically conductive layers and the other ends thereof are insulated from the other electrically conductive layer; and
a second electrode that is filled in voids between the respective tubular dielectric materials so that one end thereof is connected to the other electrically conductive layer and the other end of the second electrode is insulated from the one electrically conductive layer.

2. The capacitor according to claim 1, wherein each of the first and second electrodes and each of the electrically conductive layers are insulated from each other by a gap provided between the first electrodes and the other electrically conductive layer and a gap provided between the second electrode and the one electrically conductive layer.

3. The capacitor according to claim 1, wherein each of the first and second electrodes and each of the electrically conductive layers are insulated from each other by an insulator provided between the first electrodes and the other electrically conductive layer and an insulator provided between the second electrode and the one electrically conductive layer.

4. The capacitor according to claim 3, wherein the insulator is formed of metal oxide, SiO2 or resin.

5. The capacitor according to claim 1, wherein the tubular dielectric materials are located at apex and center positions of each hexagon forming a substantially or nearly honeycomb structure as viewed in a cross-section which is parallel to the electrically conductive layers.

6. The capacitor according to claim 3, wherein the tubular dielectric materials are located at apex and center positions of each hexagon forming a substantially or nearly honeycomb structure as viewed in a cross-section which is parallel to the electrically conductive layers.

7. The capacitor according to claim 1, wherein the tubular dielectric materials have an aspect ratio of no less than 10.

\* \* \* \* \*